US011030222B2

(12) United States Patent
Kunjur et al.

(10) Patent No.: US 11,030,222 B2
(45) Date of Patent: Jun. 8, 2021

(54) SIMILARITY SHARDING

(71) Applicant: FAIR ISAAC CORPORATION, Roseville, MN (US)

(72) Inventors: Girish Kunjur, Houston, TX (US); John R. Ripley, Round Rock, TX (US)

(73) Assignee: FAIR ISAAC CORPORATION, Roseville, MN (US)

( * ) Notice: Subject to any disclaimer, the term of this patent is extended or adjusted under 35 U.S.C. 154(b) by 139 days.

(21) Appl. No.: 16/379,060

(22) Filed: Apr. 9, 2019

(65) Prior Publication Data
US 2020/0327150 A1 Oct. 15, 2020

(51) Int. Cl.
*G06F 16/30* (2019.01)
*G06F 16/28* (2019.01)
*G06F 16/2458* (2019.01)

(52) U.S. Cl.
CPC ........ *G06F 16/285* (2019.01); *G06F 16/2468* (2019.01)

(58) Field of Classification Search
CPC ............................ G06F 16/2468; G06F 16/285
See application file for complete search history.

(56) References Cited

U.S. PATENT DOCUMENTS

| | | | | |
|---|---|---|---|---|
| 6,829,606 B2* | 12/2004 | Ripley | ................ | G06F 16/2468 |
| 6,983,322 B1* | 1/2006 | Tripp | .................... | G06F 16/951 |
| | | | | 709/225 |
| 2012/0016660 A1* | 1/2012 | Gillam | .................. | G06F 40/216 |
| | | | | 704/8 |
| 2016/0085839 A1* | 3/2016 | D'Halluin | ............... | G06F 16/21 |
| | | | | 707/747 |
| 2020/0104378 A1* | 4/2020 | Wagner | ............. | G06F 16/24552 |
| 2020/0250044 A1* | 8/2020 | Sharma | ............... | G06F 16/1834 |
| 2020/0311133 A1* | 10/2020 | Guo | ....................... | G06Q 30/02 |

OTHER PUBLICATIONS

Article entitled "Shard Selection in Distributed Collaborative Search Engines", by Berglund, dated Jun. 2013.*
Article entitled "Announcing LinkedIn's New Search Platform", by Kozak, dated Nov. 24, 2008.*
Article entitled "FICO Identity Resolution Engine", by Fair Isaac, dated Oct. 21, 2017.*
Fair Isaac Corporation. (2018). *FICO Identity Resolution Engine* [Product sheet]. 3 pages.

* cited by examiner

*Primary Examiner* — Mahesh H Dwivedi
(74) *Attorney, Agent, or Firm* — Mintz Levin Cohn Ferris Glovsky and Popeo, P.C.

(57) ABSTRACT

In one aspect, a method for similarity sharding of datatype items is provided. The method includes a set of operations or steps, including parsing a datatype item into one or more tokens, extracting at least one selected token from the parsed datatype item, the at least one selected token comprising a character string including one or more characters. The method further includes standardizing the character string of the at least one selected token, extracting a first character from the one or more characters included in the at least one standardized selected token, and assigning the datatype item to a select shard of a plurality of shards via character distribution lookup based on the extracted first character.

20 Claims, 7 Drawing Sheets

SIMILARITY SHARDING

TECHNICAL FIELD

The subject matter described herein relates to partitioning of datatype items into discrete "shards," or similar datatype items, and more particularly to a system and method for similarity sharding that isolates similarity relationships between datatype items, and allows keeping more relationships together.

BACKGROUND

In computing technology and particularly in software systems involving data management, a datatype item is a tag, identifier or piece of data representing a specific type of data. For example, a datatype may be used to identify a data field or stored data as a name, address, SSN, etc. A datatype may be contrasted with free text, which does not have a specific datatype.

The term "similarity sharding" refers to a horizontal partitioning of datatype items in a manner that isolates the similarity relationships between them by keeping similar relationships all within one partition. After the similarity sharding process, no datatype item within a single shard or partition would bear any similarity relationship with any other datatype item outside the same shard or partition. However, there may be dissimilar datatype items within a single shard.

The assumption that all similar data is within the same shard means that so called "fuzzy" search algorithms only need to focus on a single shard as opposed to all of the shards. A fuzzy search is a search process that locates data that are likely to be relevant to search query terms even when the terms do not exactly correspond to the desired information.

If the above assumption is true, performance in big-data scenarios where data needs to be fuzzy searched may be dramatically improved. Furthermore, multiple shards may be distributed across clusters of data. Conventional techniques for similarity sharding, however, come with a risk where two similar pieces of data could end up in different shards, in which case their relationship may never be found.

SUMMARY

This document describes a system and method that present a unique approach to similarity sharding in a manner that minimizes false negatives, and also tends to create a balanced distribution of data between shards.

In one aspect, a computer-implemented method for similarity sharding of datatype items includes a set of operations or steps, including parsing a datatype item into one or more tokens, extracting at least one selected token from the parsed datatype item, the at least one selected token comprising a character string including one or more characters. The computer-implemented method further includes standardizing the character string of the at least one selected token, extracting a first character from the one or more characters included in the at least one standardized selected token, and assigning the datatype item to a select shard of a plurality of shards via character distribution lookup based on the extracted first character.

In some variations one or more of the following may optionally be included. The standardizing may include one or more of converting uppercase letters to lowercase letters, downgrading upper ASCII characters to lower ASCII equivalents and identifying a synonym and converting to a most common version of the synonym. The computer-implemented method may further include storing the datatype item into a portion of memory associated with the select shard. The at least one selected token may be extracted using a combination of frequency analysis and locale-specific information. The locale-specific information may include at least one of honorifics, positions of patronymics, and/or positions of matronymics. The character distribution lookup may include a pre-computed distribution of characters in a locale that balances frequency of occurrence of datatype items across the plurality of shards and evens a distribution of the characters associated with the extracted first character of the at least one selected token of the parsed datatype item across the shards. The computer-implemented method may further include determining the character distribution lookup such that the character distribution lookup balances frequency of occurrence of datatype items across the plurality of shards and evens a distribution of the characters associated with the extracted first character of the at least one selected token of the parsed datatype item across the shards. The computer-implemented method may further include receiving a datatype item to search for similar datatype items in a sharded database storing the plurality of shards, parsing the received datatype item into one or more tokens, extracting the at least one selected token from the parsed received datatype item, extracting the first character of the at least one selected token extracted from the parsed received datatype item; searching a select one of the plurality of shards in the sharded database associated with the extracted first character to identify similar datatype items containing selected tokens similar to the selected token extracted from the parsed received datatype item, and outputting one or more of the identified similar datatype items.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

This document presents methods, systems, articles of manufacture, and the like, consistent with one or more implementations of the current subject matter which may, among other possible advantages, provide a system and method for similarity sharding to isolate similarity relationships between datatype items by keeping relationships within one partition. A shard is a subset of the datatype items contained in a database. In one embodiment, an Identity Resolution Engine (IRE) creates the shards. IRE loads up data from the database (e.g., creates a new copy), and splits up the copy of the database into shards. Further, a similarity score between two or more names or other datatype items, may be generated, where the similarity score is a measure of the degree of similarity (such as between 0 and 1) between two datatype items.

In big data, distributed systems, and computationally intensive environments, it is very desirable that data that logically belongs together be co-located (e.g., loaded in the same memory or storage space) so that the data may be processed more efficiently. Sharding data, in accordance with one implementation, involves a technique that may be used to break apart data and send the data to the various nodes in a distributed environment. As provided in further detail herein, similarity sharding enhances data analysis efficiency of substantially large volumes of data by not relying on the exactness of the data field used for sharding, but instead attempts to define or find shards that contain similar information based on identifiable sharding datatypes.

Figure 1:
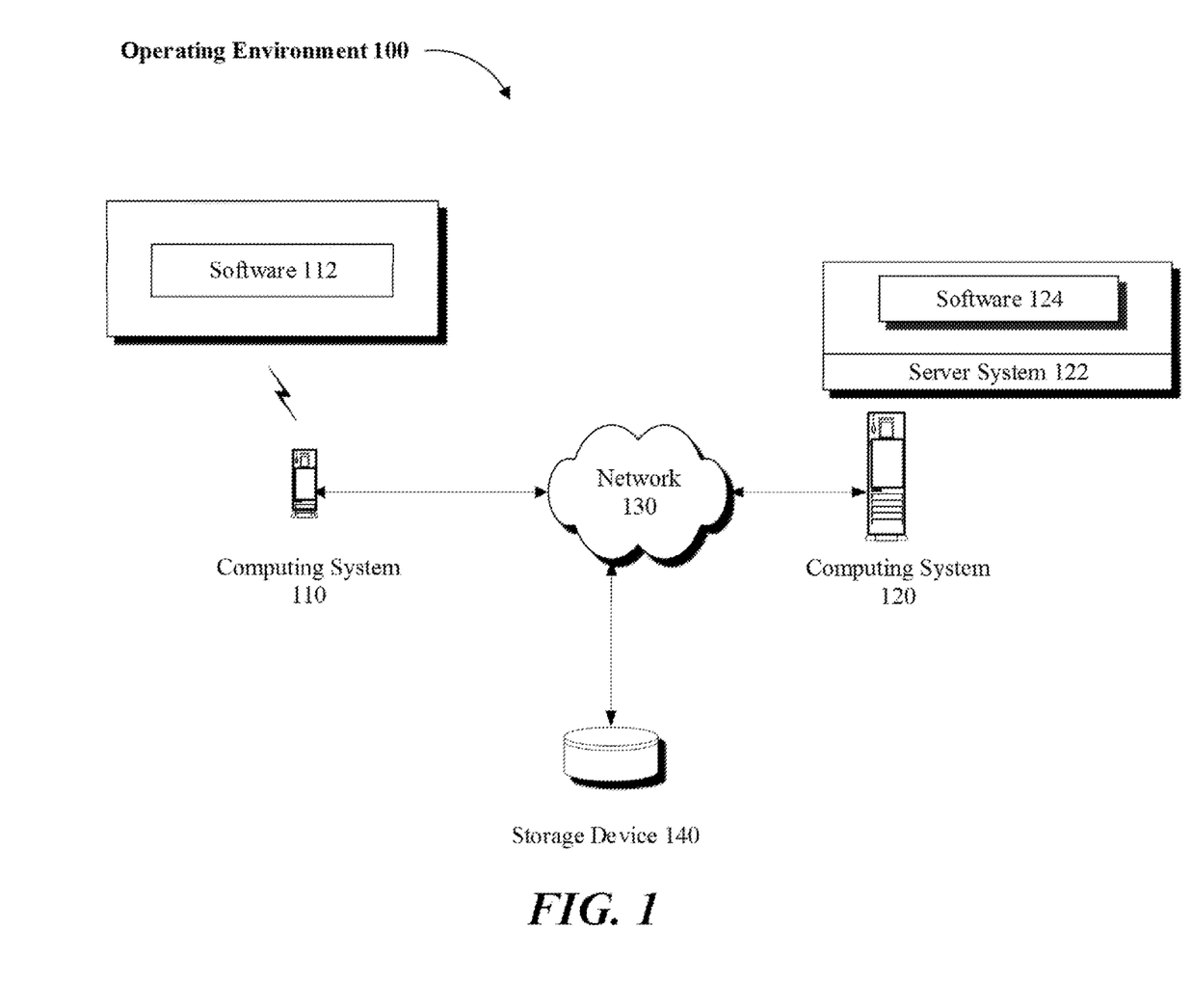
FIG. 1 illustrates an example operating environment in accordance with one or more embodiments, wherein the example operating environment may be used by a user to interact with software being executed on computing system.

Referring to FIG. 1, an example operating environment 100 is illustrated in which a computing system 110 may be used by a user to interact with software 112 being executed on computing system 110. The computing system 110 may be a general purpose computer, a handheld mobile device (e.g., a smart phone), a tablet, or other communication capable computing device. Software 112 may be a web browser, a dedicated app or other type of software application running either fully or partially on computing system 110.

Computing system 110 may communicate over a network 130 to access data stored on storage device 140 or to access services provided by a computing system 120. Depending on implementation, storage device 140 may be local to, remote to, or embedded in one or more of computing systems 110 or 120. A server system 122 may be configured on computing system 120 to service one or more requests submitted by computing system 110 or software 112 (e.g., client systems) via network 130. Network 130 may be implemented over a local or wide area network (e.g., the Internet).

Computing system 120 and server system 122 may be implemented over a centralized or distributed (e.g., cloud-based) computing environment as dedicated resources or may be configured as virtual machines that define shared processing or storage resources. Execution, implementation or instantiation of software 124, or the related features and components (e.g., software objects), over server system 122 may also define a special purpose machine that provides remotely situated client systems, such as computing system 110 or software 112, with access to a variety of data and services as provided below.

In accordance with one or more implementations, the provided services by the special purpose machine or software 124 may include providing a user, using computing system 110 or software 112, with a unique approach to similarity sharding in a manner that minimizes false negatives (e.g., where two similar pieces of data end up in different shards), and also tends to create a balanced distribution of data between shards.

Figure 2:
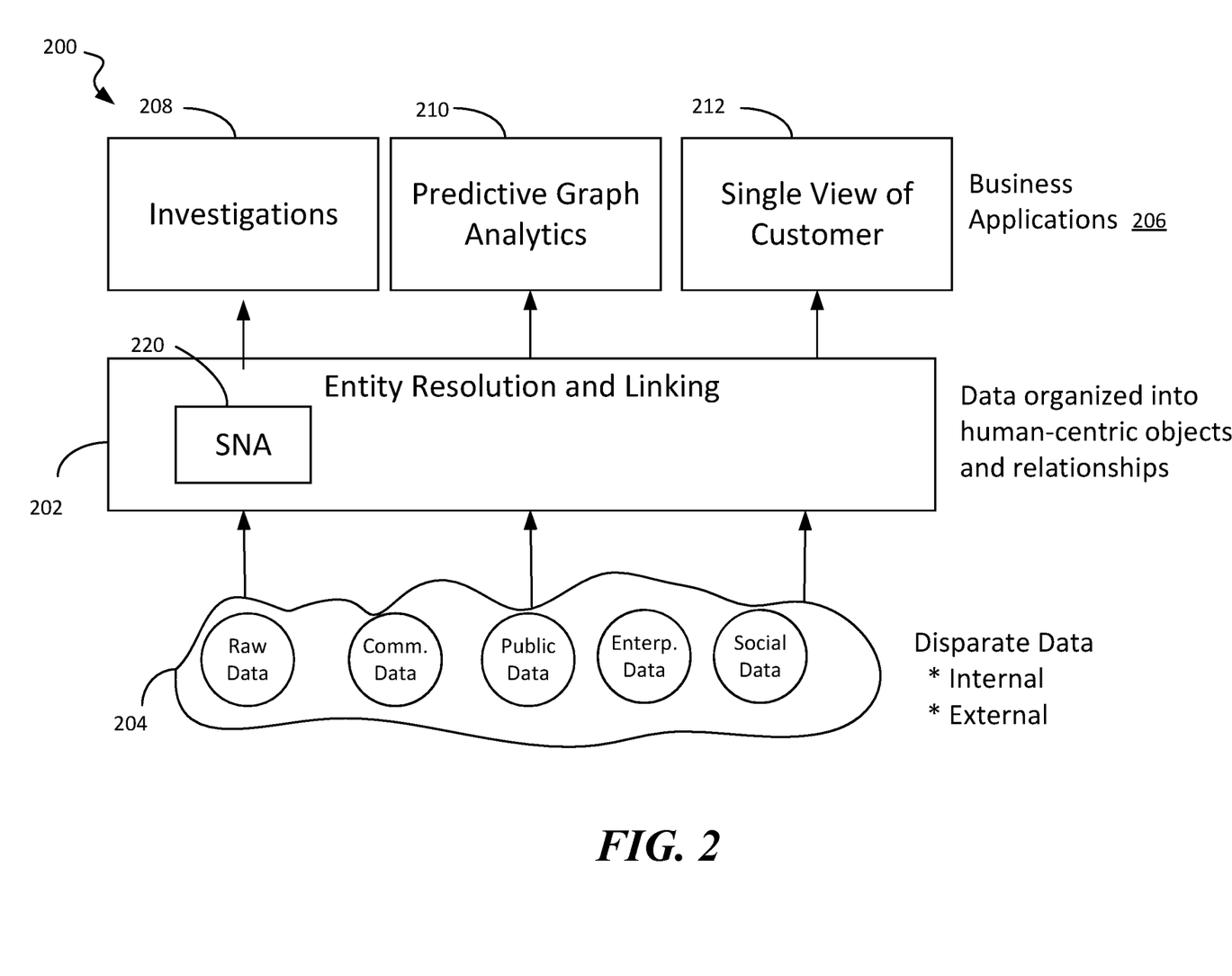
FIG. 2 is a use case diagram illustrating a system for entity resolution and linking, in accordance with one or more embodiments.

FIG. 2 is a use case diagram illustrating a system 200 for entity resolution and linking. In accordance with some implementations of the system 200, an Identity Resolution Engine (IRE) 202 is employed. The IRE 202 performs entity resolution and linking on disparate data 204, which may be a combination of internal and external data. The disparate data 204 may include one or more of raw data, commercial data, public data, enterprise data, social data, or the like. The IRE 202 organizes the disparate data 204 into human-centric objects and relationships, which may then be sent to one or more business applications 206 such as investigations 208, predictive graph analytics 210, or customer view 212. Human-centric organization may comprise taking a record from the customer database, and breaking the record down into meaningful components. For example, an application for credit may be broken down into a person's name, a social security number (SSN) of the person, an address, phone information, etc. The IRE 202 may perform this using user configuration information provided by the user. For example, the user may provide clues to IRE 202 via configuration information and the IRE 202 may use the configuration information to break down the disparate data 204 into components as described above.

Figure 3:
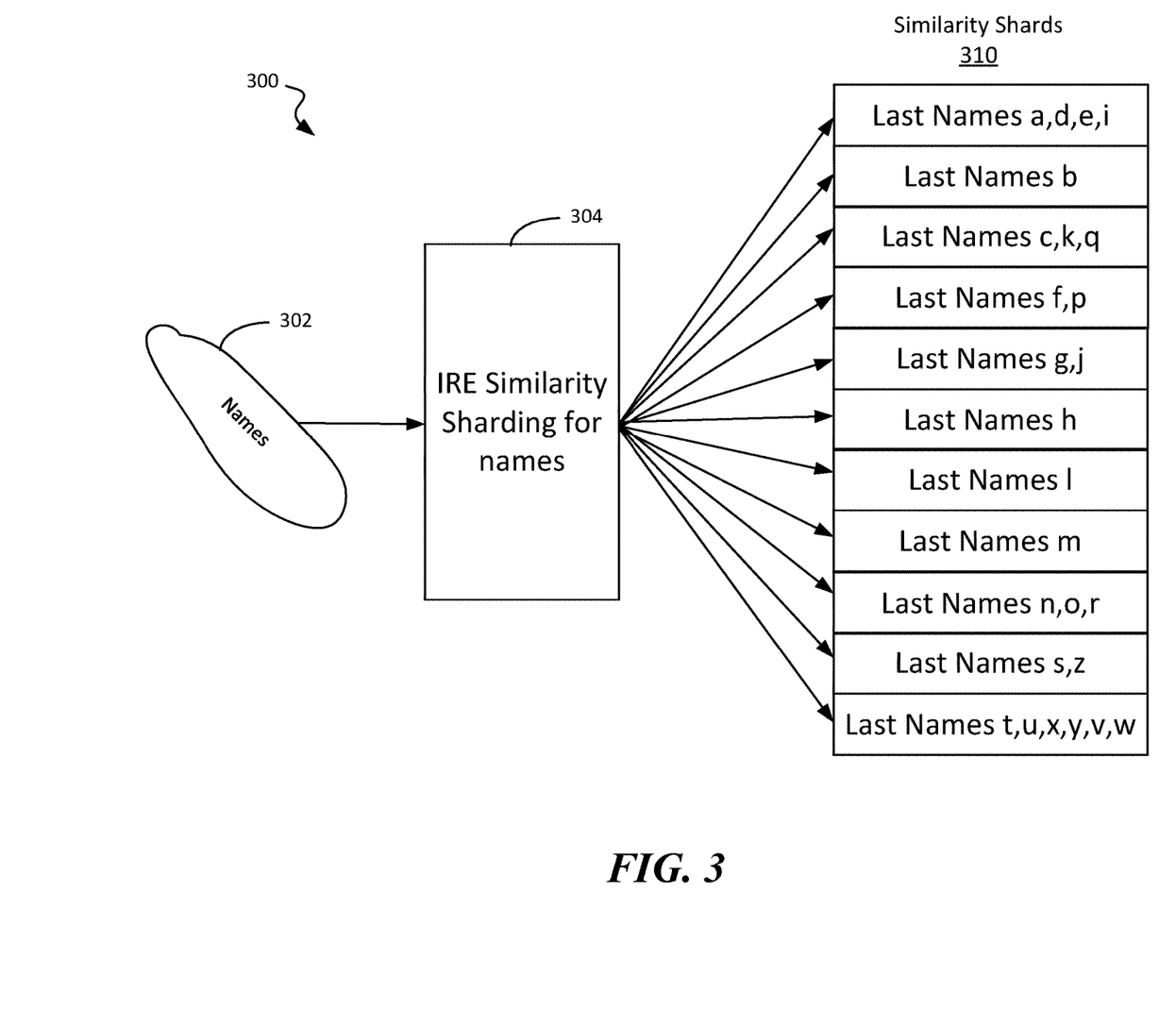
FIG. 3 illustrates one example of similarity sharding, in this case similarity sharding for people based on their names, in accordance with one or more embodiments.

FIG. 3 illustrates one example of similarity sharding based on names. In this example, an IRE 304 receives a list of names 302 (e.g., received via the network 130) and sorts them into a plurality of similarity shards 310. The similarity shards 310, in this example, are divided into 11 separate shards comprising peoples' names with last names starting with different letters of the alphabet.

The IRE 202 exploits the primary weakness of fraud perpetrators and other financial criminals and organized networks, which is the reuse of identity information (such as names, phone numbers, addresses, etc.). The IRE 202 performs a federated search that provides seamless access to disparate and remote data sources and pieces together both exact and inexact (fuzzy) linkages based on, for example, criminals' recycled data. In addition, institutions may generate, using the IRE 202, detailed match results to establish true identities ("who's who"), discover hidden or non-obvious relationships and networks ("who knows whom"), and then view results in a clear computer-generated pictorial display format that drives timely action.

The IRE 202 may include a social network analysis (SNA) 220 that proactively identifies and prioritizes organized fraud and criminal activities using relationship-driven predictive analytics. The SNA 220 leverages organized crime rings' biggest weakness—shared identity data—to identify who's who and who knows whom across enterprise and third-party data. The SNA 220 uses this information to build a relationship-based network to identify and score behavior. As a result, organizations may achieve dramatically higher detection rates and lower false positives compared to traditional rules-based or analytic fraud solutions.

A relationship-based network can be a graph depicting the linkage between customer data, and the human-centric components (referred to as entities) that the IRE 202 identified from customer data. For example the relationship-based network could link a customer record to multiple addresses, and a social security number (SSN). The SSN may be linked to another customer record. The IRE 202 can do this by first extracting the entities from customer documents, and then clustering similar entities together. For example, if 2 addresses from 2 different records are similar enough, they would be considered the same address. Higher detection rates may then be achieved owing to the ability of the IRE 202 to cluster similar entities as described above. For example, if a customer record appears 10 times with 10 slightly different addresses, which are similar enough to be the same address, then the IRE 202 can detect a similarity between the 10 addresses, and link customer record to other customer records that have that address. Without clustering of similar entities, these other customer records cannot be found as efficiently.

Figure 6:
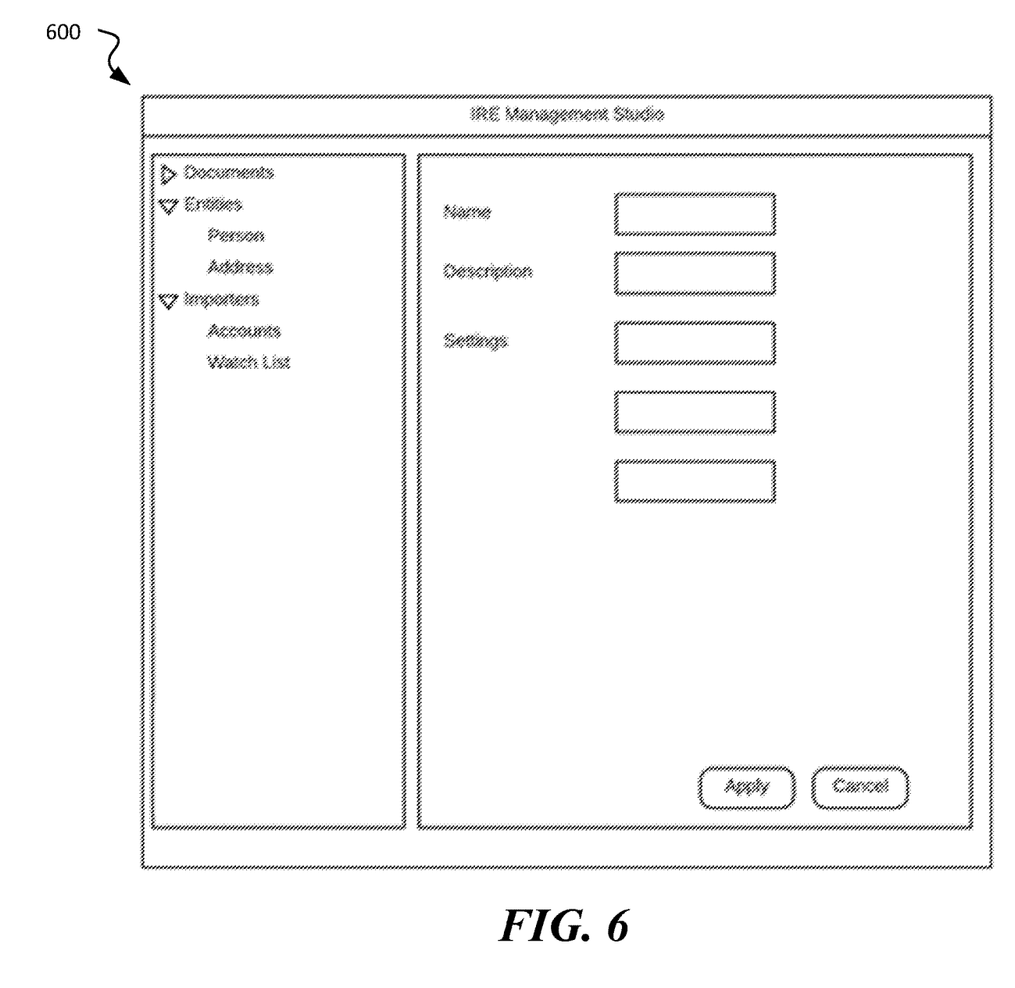
FIG. 6 illustrates an example of an Identity Resolution Engine Management Studio (IRE-MS) interface, in accordance with one or more embodiments.

The IRE 202 may connect to existing and new data sources via an Identity Resolution Engine Management Studio (IRE-MS) interface, a web-based administrative tool providing an intuitive interface for configuring and managing the IRE 202 and IRE system 200. FIG. 6 illustrates an example of an IRE-MS interface 600. The IRE-MS interface 600 may be part of the server system 122 on the computing system 120. Accordingly, the IRE 202 may support multiple database platforms, provide flexible licensing models, integrate easily into existing infrastructures and require no special training, only standard database administration (DBA).

Figure 4A:
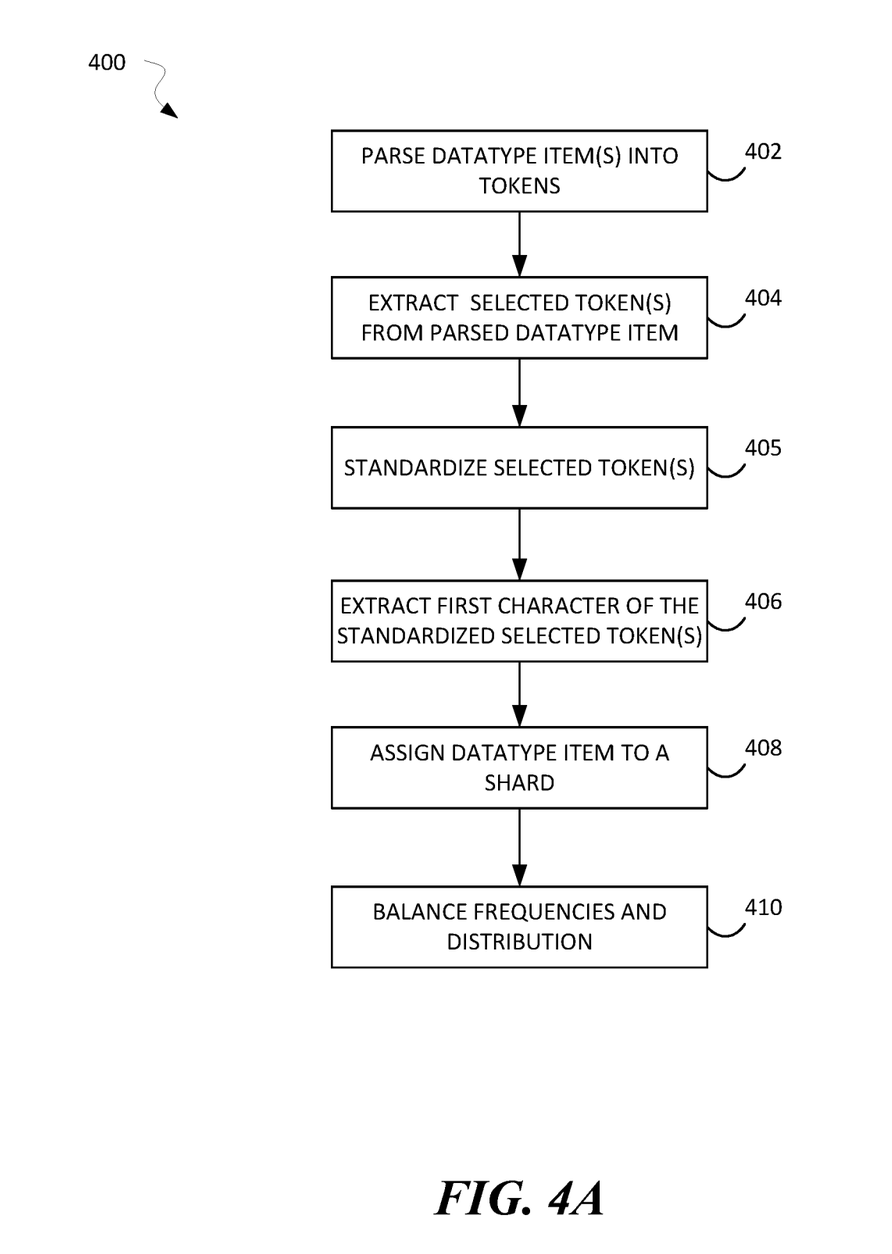
FIG. 4A illustrates a method for similarity sharding of datatype items, in accordance with one or more embodiments.

In order to shard data effectively, the IRE 202 uses knowledge of the datatype (whether the datatype is a name, company, address, etc.), and also the locale (whether the locale is Japan, UK, US, etc.). FIG. 4A illustrates a method 400 for similarity sharding of datatype items. Specifically, the method 400 provides for similarity of a number of datatype items so as to isolate similarity relationships between datatype items by keeping similar relationships all within one partition or shard.

At 402, the IRE 202 parses the datatype item into one or more tokens (e.g., character strings). The tokens may be any portion of data in the datatype item comprising, for example, alphanumeric characters including letters or numbers or other characters. At 404, the IRE 202 extracts a selected token from the datatype item. The selected token may be considered as being a token in a piece of a datatype item. Datatype-specific examples of a selected token include last names tokens for names, address street names in full addresses, and company names. (e.g., "Oracle" in "Oracle Corp." may be a selected token).

The selected token may be extracted at 404 using a combination of frequency analysis, and use of a locale-specific information such as honorifics, positions of patronymics, matronymics, etc. Using honorifics in the US example: "Mr." or "Mrs." tokens are less significant and may be ignored while trying to detect selected tokens. Using patronymic/matronymic information such as found in Mexican names, for instance, may be more significant. A patronymic/matronymic usually appears in the middle of the name rather than at the end. A middle token may generally be more significant since they occur less frequently. In regards to frequency analysis for a name like "Smith John," for example, there is a high chance that "Smith" is the last name despite being in the first position. This may be discovered through frequency analysis in which the system may inform the user that Smith is the last name, and John is the first name.

At 405, the IRE 202 standardizes the character string of the selected token based on one or more standardization techniques. The techniques used to standardize the selected token may include converting uppercase letters to lowercase letters, downgrading upper ASCII characters to lower ASCII equivalents (e.g., ö→o), looking up common synonyms and converting to a most common version of the synonym, and using other standardization techniques.

Synonym lookup may convert foreign names that are equivalent to a name specific to a locale to the locale-specific version of the name. For example, in the U.S., Juan or Giovanni (Italian equivalent to John) may be converted to John. Similarly, Enrique may be converted to Henry. In this way, the similar names will be assigned to the same shard (at 406 as described below). For example, John, Juan and Giovanni will all be assigned to the "j" shard and Enrique and Henry will both be assigned to the "h" shard. If no exact synonym is found, then similar synonyms may be identified. Similar synonyms may be identified using lexicographic analysis, identifying likely typographical errors, identifying misspellings, identifying alternative spellings, etc. The standardizing of selected tokens at 405 may be performed on all types of tokens such as addresses, phone numbers, occupation, educational degrees, etc.

At 406, the IRE 202 extracts the first character of the standardized selected token. The following are examples of how selected tokens may be standardized at 405 prior to having the first character extracted at 406:

John (lowercase)→john (synonym lookup)→john (extract first character) j

Giovanni (lowercase) giovanni (synonym lookup) john (extract first character)→j

Giovani (lowercase)→giovani (synonym lookup miss) →giovani (similarity synonym lookup) giovanni (synonym lookup)→john (extract first character)→j Jack (lowercase)→jack (synonym lookup)→john (extract first character)→j Henry (lowercase)→henry (synonym lookup)→henry (extract first character)→h Enrique (lowercase)→enrique (synonym lookup)→henry (extract first character)→h At 408 the IRE 202 assigns the datatype item to a shard (e.g., one of the similarity shards 310) based on the extracted first character (e.g., via a character distribution lookup). The datatype item is stored into memory (e.g., the storage device 140) in a portion of memory associated with the assigned shard. The character distribution lookup used at 408 can be a pre-computed distribution of characters in a specific locale that attempts to attempts to balance frequencies of occurrence of datatype items across the plurality of shards and even a distribution of the characters associated with the extracted first character of the at least one selected token of the parsed datatype item across the shards. Ideally, all shards can have approximately the same amount of data In one example, for U.S. last names (as illustrated in FIG. 3), the character distribution lookup may have 11 groups of letters: "adei", "b", "ckq", "fp", "gj", "h", "l", "m", "nor", "sz", "tuxyvw" (other characters may also be included). Thus, any last names starting with one of the letters within a group of letters will be directed to the shard associated with that group of letters. The character distribution lookup may be pre-generated based on analyzing frequencies of large amounts representative locale-specific data samples.

In cases where a pre-generated distribution lookup is used, the character distribution lookup may need to be modified at a later date in order to maintain the balance of frequencies and distribution. In these cases, or in cases where a pre-generated distribution lookup was not used, the method 400 proceeds to 410. At 410, the IRE 202 determines a character distribution lookup of groups of characters to assign to each shard. The character distribution lookup determined at 410 attempts to balance frequencies of occurrence of datatype items across the plurality of shards and even a distribution of the characters associated with the extracted first character of the at least one selected token of the parsed datatype item across the shards. Upon determining the character distribution lookup, datatype items may be stored (or restored) into the portions of memory associated with the individual shards based on the first character of the token(s) of the datatype items.

The method 400 may be repeated as new datatype items are received. The various stages 402-410 of the method 400 may, in some embodiments, be rearranged and some stages may be omitted.

Figure 4B:
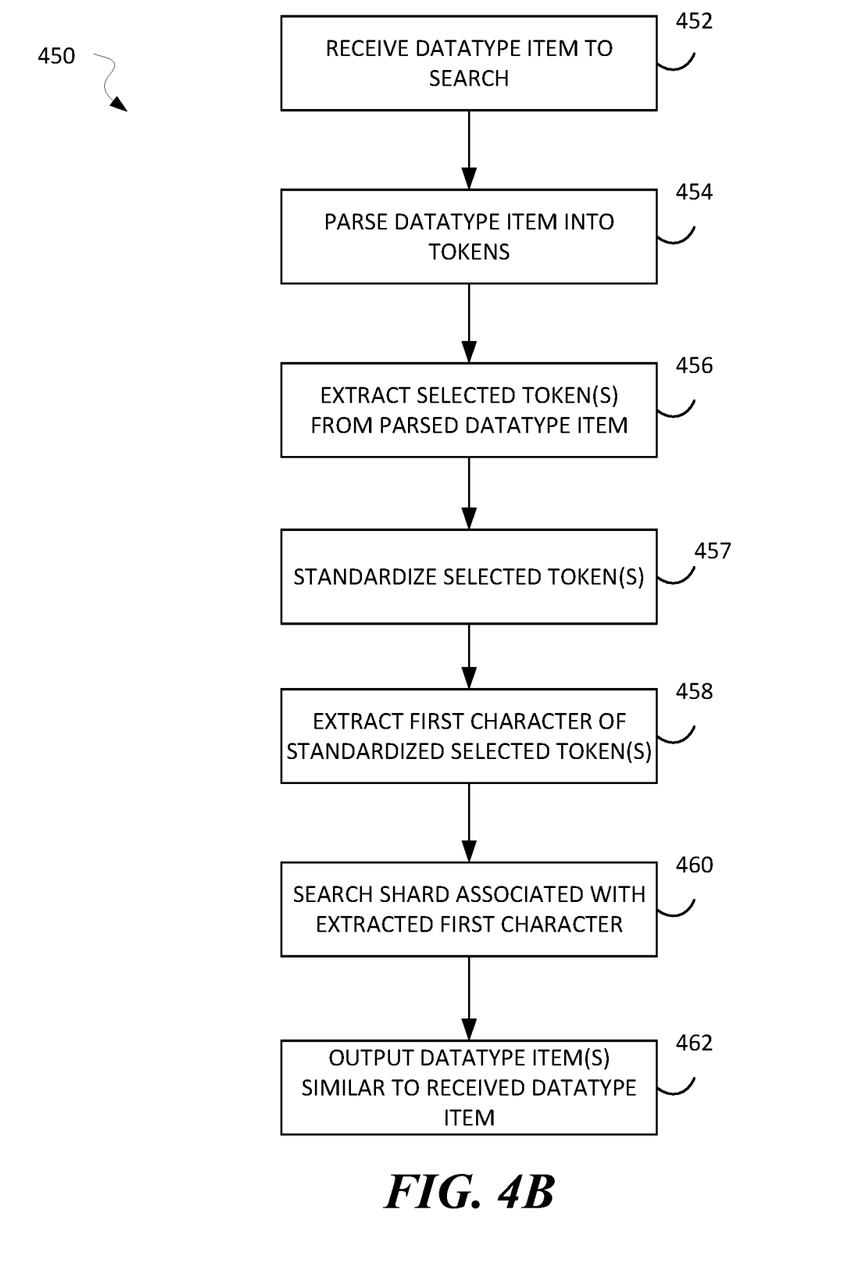
FIG. 4B illustrates a method for searching a similarity sharded database of datatype items, in accordance with one or more embodiments.

After the method 400 has been completed, the shards of datatype items stored in the memory may be utilized to search for datatype items that match or may be a close match to a new datatype item that a user may want to identify. For example, a fraud investigator may want to run a search for an address to identify if a person claiming to live at that address can be verified by datatype items stored in the similarity sharded database created using the method 400. FIG. 4B illustrates a method 450 for searching a similarity sharded database of datatype items created using the method 400.

At 452, the IRE 202 receives a datatype item to be searched for from a client device such as the computing system 110 in FIG. 1. The datatype item may be any one of a person's name, a social security number (SSN) of the person, an address, phone information, a business name or address, etc.

At 454, the IRE 202 parses the datatype item received at 452 into one or more tokens (e.g., character strings). The tokens may be any part of the datatype item comprising, for example, alphanumeric characters including letters or numbers or other characters such as described above. At 456 The IRE 202 extracts a selected token from the datatype item. The selected token may be considered as being a token in a piece of the datatype item. As described above, datatype-specific examples of the selected token may include last names tokens for names, address street names in full addresses, and company names. (e.g., "Oracle" in "Oracle Corp." may be a selected token). The selected token may be extracted using a combination of frequency analysis, and use of a locale-specific information, as described above.

At 457, the IRE 202 standardizes the character string of the selected token based on one or more techniques as described above in reference to 405. The steps used to standardize the selected token may include converting uppercase letters to lowercase letters, downgrading upper ASCII characters to lower ASCII equivalents (e.g., ö→o), identifying synonyms and converting to most common version of the synonym and using other standardization techniques.

At 458, The IRE 202 extracts the first character of the standardized selected token. At 460, the IRE 202 searches the shard associated with the extracted first character for datatype items similar to the datatype item received at 452. The shard associated with the extracted first character was created at stage 408 of the method 400 as described above. The similar datatype items may be identified using similarity search procedures. One or more types of similarity search procedures may be used at 460.

The similarity search performed at 460 assigns a similarity score associated with each identified similar datatype. The similarity score may take the form of a number or percentage such as, for example, 1 to 100 or 1% to 100%. At 462, the IRE 202 outputs similar datatype items identified at 460. The similar datatype items that are outputted may be determined based on a threshold similarity score. For example, if the threshold similarity score is 90%, then the IRE 202 will output any similar datatype items with a similarity score greater than or equal to 90%. The threshold similarity score may have a default value. The threshold similarity score may be adaptable such that the user may tune the threshold similarity score to provide for more fuzzy (or distant) datatype items or to provide for more exact (or close) datatype items. The outputted similar datatype items may be communicated to the client device (e.g., the computing system 110) via the network 130.

In some instances, it may be desirable to perform a more exhaustive search to match the datatype item received at 452. In these instances, the actions performed at stages 456, 457 and 458 may be omitted and the IRE 202, at 460, searches every shard for datatype items similar to the datatype item received at 452. This type of exhaustive search takes more time and computational power, but increases the likelihood of a more exact match.

The method 450 may be repeated such that new datatype items to be searched for are received. The various stages 452-462 of the method 450 may, in some embodiments, be rearranged and some stages may be omitted.

Figure 5:
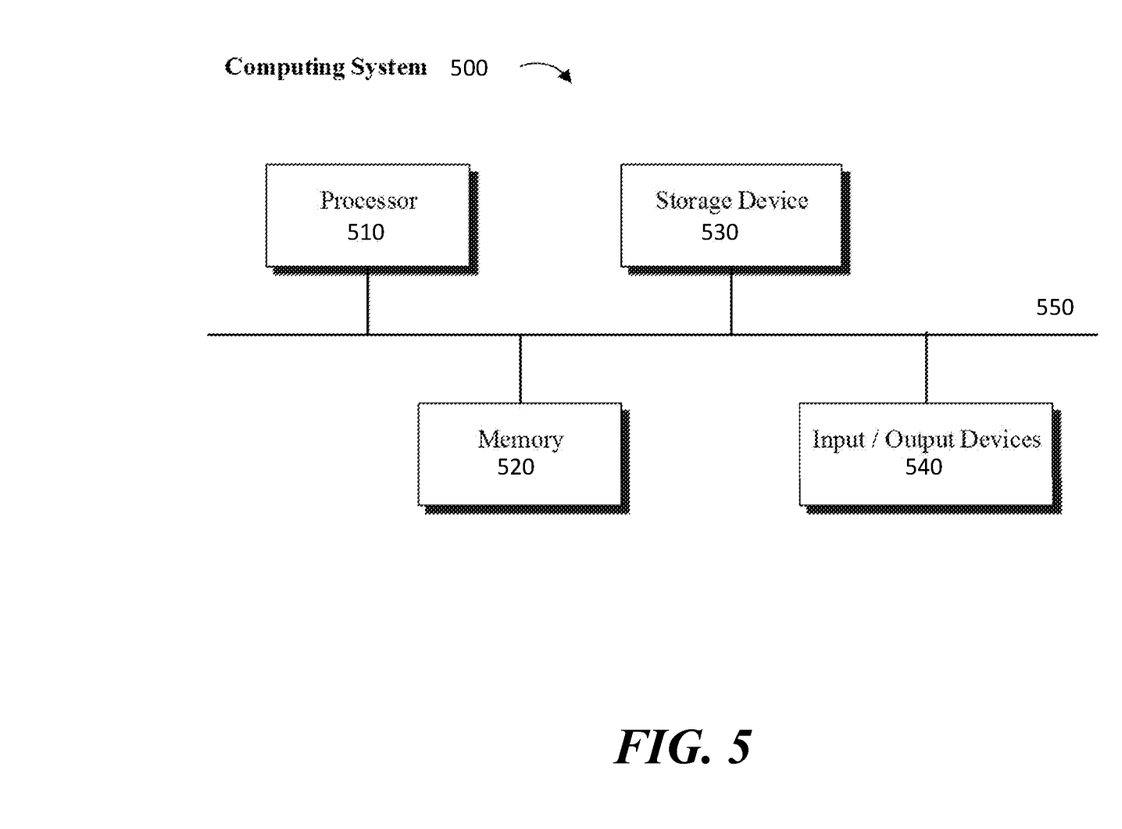
FIG. 5 is a block diagram of a computing system that may be utilized to perform one or more computer processes disclosed herein as consistent with one or more embodiments.

Referring to FIG. 5, a block diagram illustrating a computing system 500 consistent with one or more embodiments is provided. The computing system 500 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 5, the computing system 500 may include a processor 510, a memory 520, a storage device 530, and input/output devices 540. The processor 510, the memory 520, the storage device 530, and the input/output devices 540 may be interconnected via a system bus 550. The processor 510 is capable of processing instructions for execution within the computing system 500. Such executed instructions may implement one or more components of, for example, a cloud platform. In some implementations of the current subject matter, the processor 510 may be a single-threaded processor. Alternately, the processor 510 may be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 may store data structures representing configuration object databases, for example. The storage device 530 is capable of providing persistent storage for the computing system 500. The storage device 530 may be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 may provide input/output operations for a network device. For example, the input/output device 540 may include Ethernet ports or other networking ports to communicate with one or more wired and/or wireless networks (e.g., a local area network (LAN), a wide area network (WAN), the Internet).

In some implementations of the current subject matter, the computing system 500 may be used to execute various interactive computer software applications that may be used for organization, analysis and/or storage of data in various (e.g., tabular) format (e.g., Microsoft Excel®, and/or any other type of software). Alternatively, the computing system 500 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 540. The user interface may be generated and presented to a user by the computing system 500 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. A computer-implemented method comprising:
   parsing a datatype item into one or more tokens;
   extracting at least one selected token from the parsed datatype item, the at least one selected token comprising a character string including one or more characters;
   standardizing the character string of the at least one selected token;
   extracting a first character from the one or more characters included in the at least one standardized selected token; and
   assigning the datatype item to a select shard of a plurality of shards via a character distribution lookup based on the extracted first character, wherein the character distribution lookup comprises a pre-computed distribution of characters based on analysis of first character frequencies of a plurality of representative geographic locale-specific data samples, the pre-computed distribution of characters configured to balance frequency of occurrence of datatype items associated with the geographic locale across the plurality of shards.

2. The computer-implemented method in accordance with claim 1, wherein the standardizing comprises one or more of converting uppercase letters to lowercase letters, downgrading upper ASCII characters to lower ASCII equivalents, or identifying a synonym and converting to a most common version of the synonym.

3. The computer-implemented method in accordance with claim 1, further comprising storing the datatype item into a portion of memory associated with the select shard.

4. The computer-implemented method in accordance with claim 1, wherein the at least one selected token is extracted using a combination of frequency analysis and locale-specific information.

5. The computer-implemented method in accordance with claim 4, wherein the locale-specific information includes at least one of honorifics, positions of patronymics, or positions of matronymics.

6. The computer-implemented method in accordance with claim 1, wherein the pre-computed distribution of characters is further configured to even a distribution of the characters associated with the extracted first character of the at least one selected token of the parsed datatype item across the shards.

7. The computer-implemented method in accordance with claim 1, further comprising determining the pre-computed distribution of characters based on the analysis of first character frequencies of the plurality of representative geographic locale-specific data samples.

8. The computer-implemented method in accordance with claim 1, further comprising:
   receiving a searchable datatype item associated with the geographic location to search for one or more similar datatype items in a sharded database storing the plurality of shards;
   parsing the searchable datatype item into one or more searchable tokens;
   extracting at least one selected searchable token from the parsed searchable datatype item;
   extracting an additional first character of the at least one selected searchable token extracted from the parsed searchable datatype item;
   searching a select one of the plurality of shards in the sharded database associated with the extracted first character to identify similar datatype items containing selected tokens similar to the selected token extracted from the parsed received datatype item; and
   outputting one or more of the identified similar datatype items.

9. The computer-implemented method of claim 1, wherein the character distribution lookup comprises a plurality of groups of letters corresponding to first characters, and wherein letters in the plurality of groups of letters are grouped according to the analysis of first character frequencies and are not limited to alphabetical subranges.

10. The computer-implemented method of claim 9, further comprising modifying the character distribution lookup to rebalance datatype items across the plurality of shards, the modifying comprising regrouping letters in the plurality of groups of letters without limiting to alphabetical subranges.

11. A system comprising:
    at least one programmable processor; and
    a non-transitory machine-readable medium storing instructions that, when executed by the at least one programmable processor, cause the at least one programmable processor to perform operations comprising:
    parsing a datatype item into one or more tokens;
    extracting at least one selected token from the parsed datatype item, the at least one selected token comprising a character string including one or more characters;
    standardizing the character string of the at least one selected token;
    extracting a first character from the one or more characters included in the at least one standardized selected token; and
    assigning the datatype item to a select shard of a plurality of shards via character distribution lookup based on the extracted first character, wherein the character distribution look up comprises a pre-computed distribution of characters based on analysis of first character frequencies of a plurality of representative geographic locale-specific data samples, the pre-computed distribution of characters configured to balance frequency of occurrence of datatype items associated with the geographic locale across the plurality of shards.

12. The system in accordance with claim 11, wherein the standardizing comprises one or more of converting uppercase letters to lowercase letters, downgrading upper ASCII characters to lower ASCII equivalents, or identifying a synonym and converting to a most common version of the synonym.

13. The system in accordance with claim 11, the operations further comprising storing the datatype item into a portion of memory associated with the select shard.

14. The system in accordance with claim 11, wherein the at least one selected token is extracted using a combination of frequency analysis and locale-specific information.

15. The system in accordance with claim 14, wherein the locale-specific information includes at least one of honorifics, positions of patronymics, or positions of matronymics.

16. A computer program product comprising a non-transitory machine-readable medium storing instructions that, when executed by at least one programmable processor, cause the at least one programmable processor to perform operations comprising:
   computing first character frequency statistical data for a geographic locale from a plurality of representative locale-specific data samples associated with the geographic locale;
   based at least on the first character frequency statistical data for the geographic locale, generating a character distribution lookup that is configured to predictively balance frequency of occurrence of datatype items associated with the geographic locale across a plurality of shards;
   parsing a datatype item into one or more tokens;
   extracting at least one selected token from the parsed datatype item, the at least one selected token comprising a character string including one or more characters;
   standardizing the character string of the at least one selected token;
   extracting a first character from the one or more characters included in the at least one standardized selected token; and
   assigning, based on the extracted first character, the datatype item to a select shard of the plurality of shards via the character distribution lookup.

17. The computer program product in accordance with claim 16, wherein the standardizing comprises one or more of converting uppercase letters to lowercase letters, downgrading upper ASCII characters to lower ASCII equivalents, or identifying a synonym and converting to a most common version of the synonym.

18. The computer program product in accordance with claim 16, the operations further comprising storing the datatype item into a portion of memory associated with the select shard.

19. The computer program product in accordance with claim 16, wherein the at least one selected token is extracted using a combination of frequency analysis and locale-specific information.

20. The computer program product in accordance with claim 19, wherein the locale-specific information includes at least one of honorifics, positions of patronymics, or positions of matronymics.

* * * * *